(12) United States Patent  (10) Patent No.: US 7,874,236 B2
Diener  (45) Date of Patent:  Jan. 25, 2011

(54) METAL CUTTING BAND SAW WITH SUSPENDED SAW FRAME

(76) Inventor: Mark Diener, Fichtenweg 13, Westerheim (DE) 72589

( * ) Notice: Subject to any disclaimer, the term of this patent is extended or adjusted under 35 U.S.C. 154(b) by 0 days.

(21) Appl. No.: 12/512,773

(22) Filed: Jul. 30, 2009

(65) Prior Publication Data

US 2009/0288541 A1  Nov. 26, 2009

Related U.S. Application Data

(62) Division of application No. 12/151,183, filed on May 5, 2008, now abandoned, which is a division of application No. 10/520,244, filed as application No. PCT/DE03/02074 on Jun. 21, 2003, now abandoned.

(30) Foreign Application Priority Data

Jul. 3, 2002  (DE) ............................... 102 29 999

(51) Int. Cl.
*B23D 53/04*  (2006.01)
(52) U.S. Cl. ........................................ 83/798; 83/811

(58) Field of Classification Search ............... 83/798, 83/810–812, 486.1, 471.3
See application file for complete search history.

(56) References Cited

U.S. PATENT DOCUMENTS

| 2,555,056 | A | * | 5/1951 | Pence | ............................ 83/798 |
| 2,928,439 | A | * | 3/1960 | Tester | ............................ 83/798 |
| 3,884,106 | A | * | 5/1975 | Aizawa | ........................ 83/453 |
| 4,111,085 | A | * | 9/1978 | Johnson | ........................ 83/871 |
| 4,454,794 | A | * | 6/1984 | Thornton | .................... 83/471.3 |
| 6,655,252 | B2 | * | 12/2003 | Epple | ............................ 83/732 |

FOREIGN PATENT DOCUMENTS

EP  0722814  *  7/1996

* cited by examiner

*Primary Examiner*—Kenneth E. Peterson
(74) *Attorney, Agent, or Firm*—Leydig, Voit & Mayer, Ltd.

(57) ABSTRACT

A metal cutting band saw is provided that includes a main carrier, on which an intermediate carrier is pivotally mounted. The saw frame, which can be adjusted in the direction of the workpiece, is mounted on the intermediate carrier by a swivel support or a parallel guide. The swivel support for connecting the main carrier to the intermediate carrier is located above the workpiece to be processed.

9 Claims, 6 Drawing Sheets

METAL CUTTING BAND SAW WITH SUSPENDED SAW FRAME

CROSS-REFERENCE TO RELATED APPLICATIONS

This patent application is a divisional of U.S. patent application Ser. No. 12/151,183, filed May 5, 2008 (abandoned) which is a divisional of U.S. patent application Ser. No. 10/520,244, filed Sep. 2, 2005 (abandoned), which is a National Stage of PCT/DE/03/02074 filed Jun. 21, 2003.

FIELD OF THE INVENTION

The present invention relates to metal cutting band saws, and in particular, to metal cutting band saws for mitering elongated workpieces.

BACKGROUND OF INVENTION

A metal cutting band saw with a machine frame on which the workpiece to be cut is placed is disclosed in DE 40 40 470 A1. The machine frame is provided with a vise for fixing the workpiece to be processed on the machine frame. The vise contains a stationary clamping jaw that also serves as a reference surface. A swivel support allows the saw frame in which the bandsaw blade is supported to move into different miter positions. The required swivel support is arranged underneath the plane of the workpiece and carries not only the saw frame but also a workpiece support table that serves to support the part of the workpiece that is subjected to the cutting process during sawing. The advantage of this arrangement is that the bandsaw blade does not produce a horizontal pivoting motion relative to the support table and consequently always cuts into the support table at the same location independent of the adjusted miter position.

However, this advantage can only be achieved if one is willing to accept several significant disadvantages. For example, the swivel support is located in a region in which dirt, chips and cutting compound accumulate. The swivel support itself is difficult to access for maintenance work. When the miter angle is adjusted, the table underneath the workpiece must also be pivoted. The forces exerted upon the support table by the workpiece are quite variable and depend on the relative shape of the workpiece. Thus, forces that vary significantly occur when the table must be pivoted. This is the reason the drive for adjusting the miter angle must be designed for the highest occurring force. These high forces make exact adjustment of the miter angle practically impossible. Due to the inherent elasticity of the entire arrangement, stresses of varying intensity occur as a function of the friction conditions between the support table and the workpiece. The actual miter position deviates from the desired miter position as a function of the stress.

SUMMARY OF THE INVENTION

Based on these circumstances, an object of the invention is to develop a new metal cutting band saw that eliminates the aforementioned disadvantages.

The novel metal cutting band saw includes a machine frame that comprises a support device for the workpiece. A swivel support is arranged on a main carrier that stands adjacent to the support device. The swivel support is located above the support device and consequently above the workpiece to be processed. An intermediate carrier with the saw frame movably mounted thereon is seated on the swivel support. The miter position can be adjusted with the aid of the swivel support and the intermediate carrier.

Since the swivel support is arranged above the workpiece, significant force is not required to pivot the intermediate carrier. During the adjustment of the miter angle, no parts that are connected to the swivel support or the intermediate frame engage with the workpiece in any way. Thus, the force required to adjust the intermediate carrier is only dependent on the extremely low bearing forces, and the adjustment of the miter position is consequently not impaired by any inherent elasticities of the system.

Since the swivel support is arranged above the workpiece, it is located in a region in which neither cutting compound nor chips accumulate. The sealing of the swivel support is thereby significantly simplified. The reduced risk of soiling also has very favorable effects on the service life and the swivel support accuracy. In addition, the novel arrangement is very compact in the material flow direction.

In another embodiment of the metal cutting band saw according to the invention, the swivel support is not located between the main carrier and the auxiliary carrier, but rather between the auxiliary carrier and the saw frame. The auxiliary carrier can be vertically displaced on the main carrier in order to carry out the movements required for producing the cut. The swivel support connects the saw frame to the auxiliary carrier and is thus also located in a protected region above the workpiece.

Depending on the design of the main carrier, it is possible to easily reach miter angles up to 30° without having to significantly increase the size of the machine in the longitudinal direction, i.e., in the direction of the material flow. In prior art sawing machines it is necessary to use a sector shaped turntable, with the sector angle of double miters corresponding to twice the possible miter angle. The dimensions of the support table itself thereby produce a machine of significant size.

The main carrier can be configured in two different ways. The main carrier can be in the form of a gantry or a gallows. The configuration in the shape of a gantry in particular is highly robust, since it is suitable for applications entailing extremely large cutting widths. In such a case, the distance between the uprights is preferably greater than the corresponding width of the saw frame, so that arbitrary adjustments of the miter position can be accomplished.

The gallows shaped configuration, in contrast, has the significant advantage that the support table for the workpiece is accessible from the side. Long workpieces that must be separated in a central region can be introduced into the machine from the side and need not be placed on and pushed through the machine longitudinally.

If the projecting beam of the gallows shaped configuration lies parallel to the material flow direction so that the upright is offset relative to the cutting position in the material flow direction, it is possible to produce miter position adjustments easily in both directions. On the other hand, the upright may be moved very close to the cutting point so that the projecting beam can be made relatively short. The uprights may be rigidly connected to the machine frame or mounted independently of it on a concrete foundation.

Different designs can also be considered for the intermediate carrier, on which the saw frame is mounted. For example, the intermediate carrier may have the form of an L if the saw frame is guided only on one end. Alternatively, the intermediate carrier may generally have the form of a fork. This is advantageous if the saw frame is adjusted in the direction of the workpiece along a linear axis.

The support device for the workpiece essentially consists of a table top that is in the form of a replaceable part. The saw cuts into the table top during the sawing process. With time, the table top is consumed if the constantly changing miter positions do not correspond. However, since only a few miter angles are usually required, only a small number of cuts is produced in the table top such that a long service live can in any case be expected.

In order to simplify the loading of the workpiece into the sawing machine, the support device contains rollers. The outer circumferential surface of the rollers contact a plane that also includes the table top.

In order to hold the workpiece precisely, particularly when producing miter cuts, a vise with a stationary jaw and an adjustable jaw is assigned to the support device in order to clamp the workpiece between the jaws. The stationary jaw typically forms a reference plane that is contacted by the workpiece and relative to which the miter angle is measured. In order to simplify the determination of the length of the workpiece to be cut into sections, the vertical swivel axis preferably lies in a plane that is defined by the stationary jaw of the vise.

DETAILED DESCRIPTION OF THE INVENTION

Figure 1:
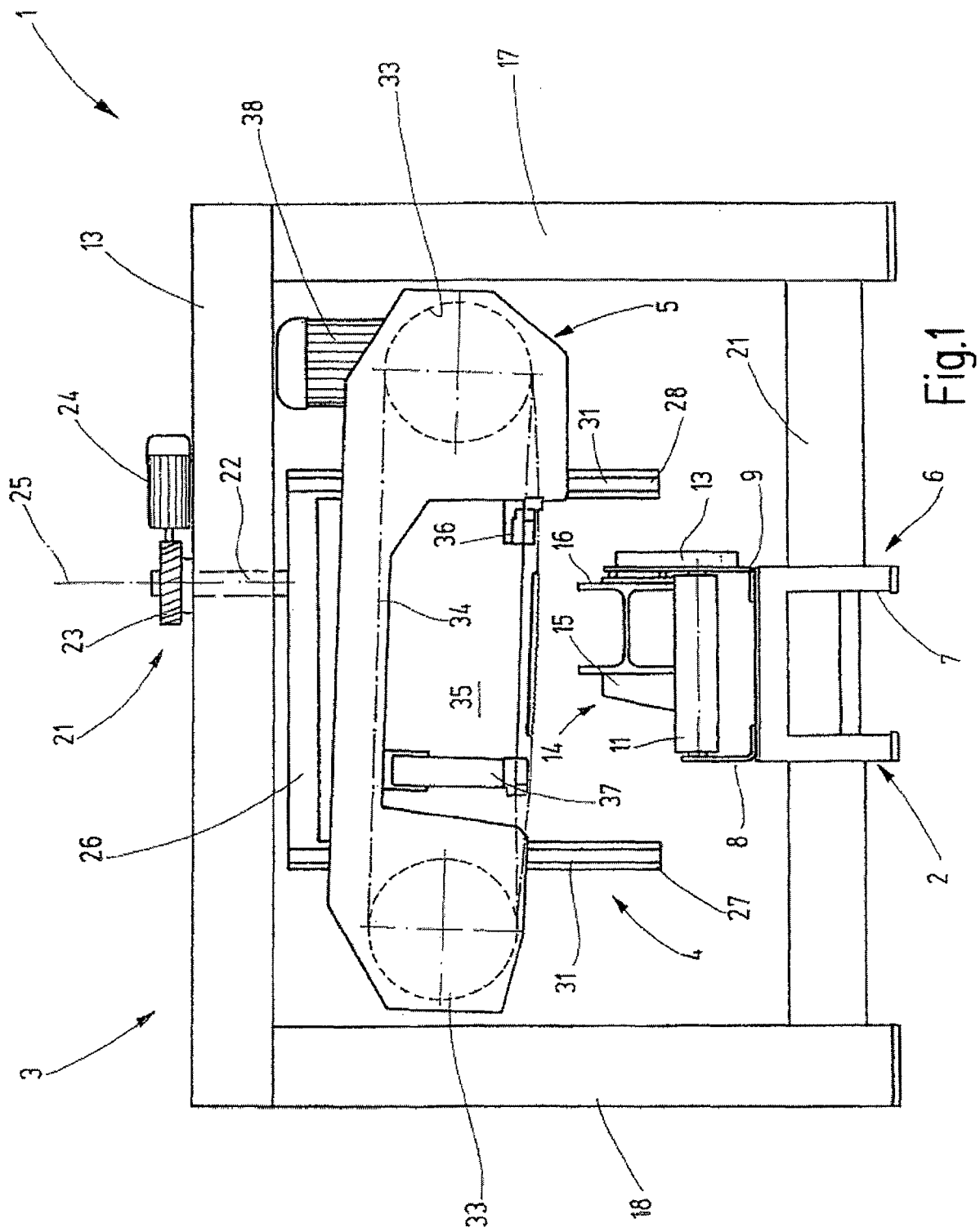
FIG. 1 is an end view of an exemplary metal cutting band saw according to the invention with a gantry shaped main carrier.
Figure 2:
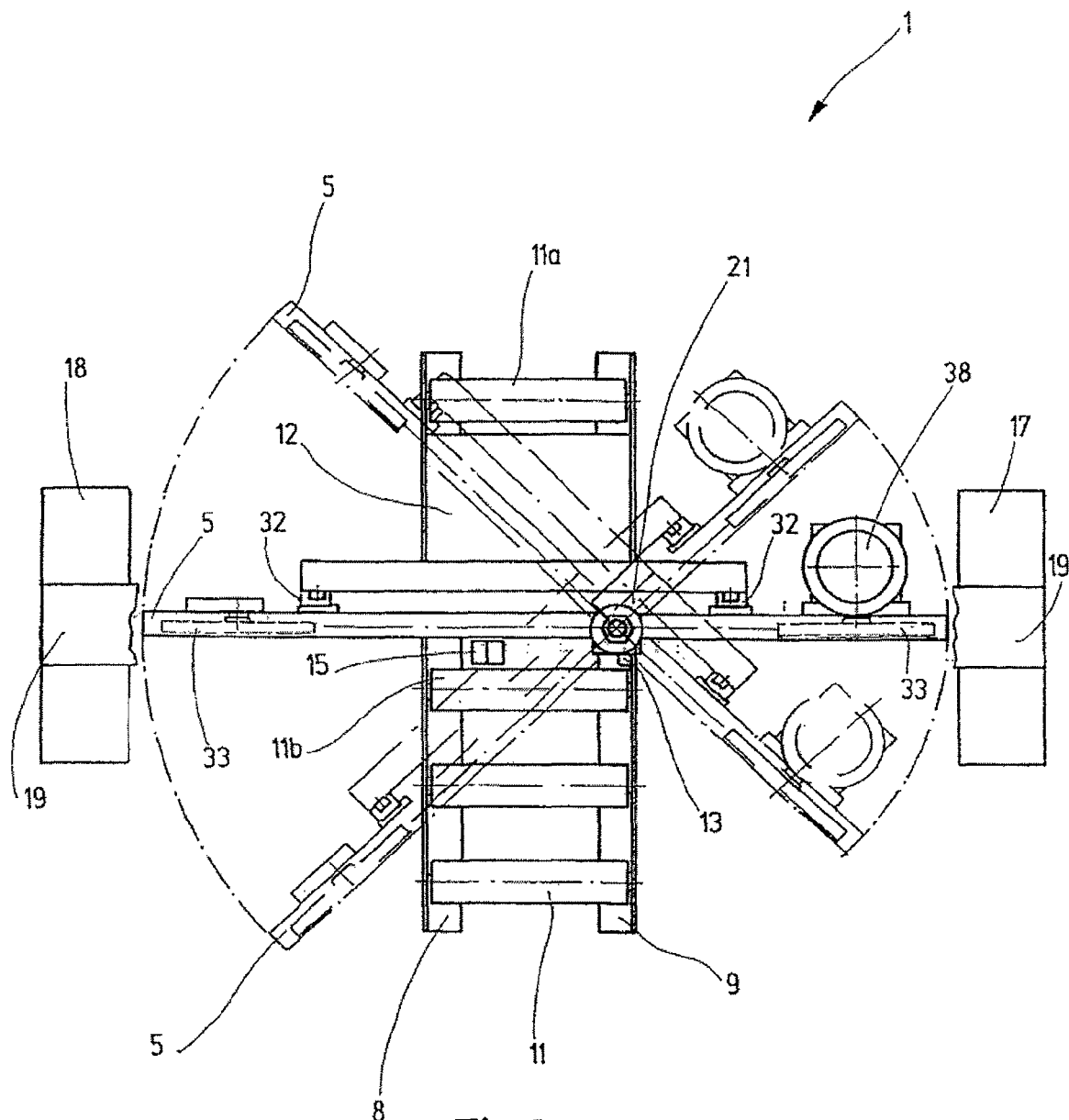
FIG. 2 is a top view of the metal cutting band saw of FIG. 1, in which the miter position adjustments are shown by broken lines.

FIGS. 1 and 2 show a metal cutting band saw 1 according to the invention. The metal cutting band saw 1 has a machine frame 2, with a gantry shaped main carrier 3 that is mounted on the floor foundation spanning the machine frame. An intermediate carrier 4 that serves to hold a saw frame 5 is pivotally supported on the main carrier 3.

The machine frame 2 consists of a lower frame 6 with legs 7. Two angled profile rails 8 and 9 that extend continuously in the longitudinal direction are mounted on the upper side of the frame 6. Several rollers 11 that serve as a workpiece support are arranged axially parallel and adjacent to one another between the angled profile rails 8 and 9. The rollers 11 can rotate freely and their upper sides are tangent to an imaginary common plane. Between the rollers 1a and 1b, a plate like support table 12 lies on the lower frame 7 between the profile rails 8 and 9. In its initial state, the support table 12 has a flat, smooth surface that lies at the same level as the plane defined by the rollers 11.

A stationary jaw 13 of a vise 14 is mounted next to the profile rail 9. The stationary jaw carries a flat contact surface. The vise 14 also contains a movable jaw 15 that can be adjusted perpendicularly to the stationary jaw 13 on rails (not shown). The workpiece 16, in the form of an I beam 16, is clamped between the two jaws 13 and 15 in FIG. 1. The I beam 16 extends perpendicular to the projection plane of FIG. 1.

The main carrier 3 is composed of two uprights 17 and 18 that are interconnected by means of a crossbeam 19. The two uprights 17 and 18 stand on either side of the machine frame 2 and are connected, if so required, to the machine frame 2 by means of an additional crossbeam 20.

The crossbeam 19 contains a swivel support 21 that serves to connect the main carrier 3 to the intermediate carrier 4. The swivel support 21 contains a support spindle 22 that extends through a corresponding bore in the crossbeam 19. On its upper end, the spindle 22 is connected without rotational play to a gear wheel 23 that meshes with the screw of a drive motor 24. The spindle 22 is axially secured in the crossbeam 19 with conventional elements (not shown in detail), for example, deep groove ball bearings. On its lower end, the spindle 22 is connected without rotational play to the intermediate carrier 4. The spindle 22 defines a vertical swivel axis 25 that lies in a plane that also includes the workpiece contact surface of the stationary clamping jaw 13.

The intermediate carrier 4 has the form of a fork and is composed of a crossbeam 26 as well as two parallel arms 27 and 28 separated by a certain distance.

The crossbeam 26 extends horizontally and consequently parallel to the crossbeam 19, where both arms 27 and 28 are aligned parallel to the vertical swivel axis 25. Each of the two arms 27 and 28 carry a guide rail 31 on the side that faces the viewer of FIG. 1. The guide rails are parallel and cooperate with complementary slides on the saw frame 5. The complementary slides are shown in the top view of FIG. 2 and are designated by reference symbol 32. The slides 32 and the guide rails 31 may be realized such that they form ball bearing travelers.

The saw frame 5 consists of a box shaped housing, in which two rollers 33 (indicated by broken lines) are supported axially parallel to one another. The axes of rotation extend horizontally. The bandsaw blade 34 runs around the two rollers 33. In its lower region, the saw frame 5 is provided with a recess 35, where the bandsaw blade 34 is exposed. Two bandsaw blade guides 36 and 37 are arranged in the region of this recess 35. These bandsaw blade guides turn the bandsaw blade 34 so that the working edge of the teeth of the bandsaw blade point downward from between the two bandsaw blade guides 36 and 37, as shown, while the rest of the bandsaw blade 34 lies flat against the guides.

The right roller 33 can be selectively set in rotation with the aid of a drive motor 38 that is flanged to the rear side of the saw frame 5. Another drive (not shown) serves for adjusting the saw frame 5 in the direction of the workpiece 16 during the cutting process.

As shown in FIGS. 1 and 2, distance between the two uprights 17 and 18 is sufficiently large to accommodate the saw frame 5 with the interposed drive motor 38.

The function of the illustrated metal cutting band saw 1 is described below:

After the vise 14 is opened, a workpiece 16 is supplied by means of the support rollers 11 and then clamped between the two clamping jaws 13 and 15 by closing the vise 14. The clamping jaws 13 and 15 are positioned and adjustable in such a way that the bandsaw blade 34 cannot collide with the clamping jaws 13 and 15 in any miter position.

After the workpiece 16 is clamped in position, the desired miter angle is adjusted by actuating the drive motor 24. This causes the spindle 22 to turn about the vertical axis 25, with the intermediate carrier 4 as well as the saw frame 5 participating in this swiveling movement. The swiveling movement is stopped as soon as the desired angle between the bandsaw blade 34 and the longitudinal axis of the workpiece 16 is reached. Due to the special type of geared connection between the spindle 22 and the drive motor 24, any rotational movement of the spindle 22 is blocked after the drive motor 24 is at a standstill, i.e., the chosen miter position is maintained.

After the miter angle is adjusted, the saw frame 5 is guided vertically downward along the two arms 27 and 28 that act as a parallel guide, with the aid of a not shown drive motor. During this downward movement, the bandsaw blade 34, which is positioned with its working edge between the two bandsaw blade guides 36 and 37, cuts into and through the workpiece 16. The adjusting movement is stopped after the workpiece 16 is completely separated. During this process, the bandsaw blade 34 also cuts into the support table 12 a certain distance.

After the workpiece 16 is separated, the saw frame 5 is moved back into the upper position shown in FIG. 1 along the two arms 27 and 28 by the driving device. In this position, a free passage is created between the bandsaw blade 34 and the upper side of the workpiece support device 2.

Instead of using a stationary vise 14, the machine frame 2 may also be provided with a vise such as disclosed in DE 40 40 470. In such an arrangement, the movable clamping jaw 15 can be moved back and forth horizontally, parallel to the stationary clamping jaw 13, in order to securely clamp the workpiece 16 in position at any miter angle.

Figure 3:
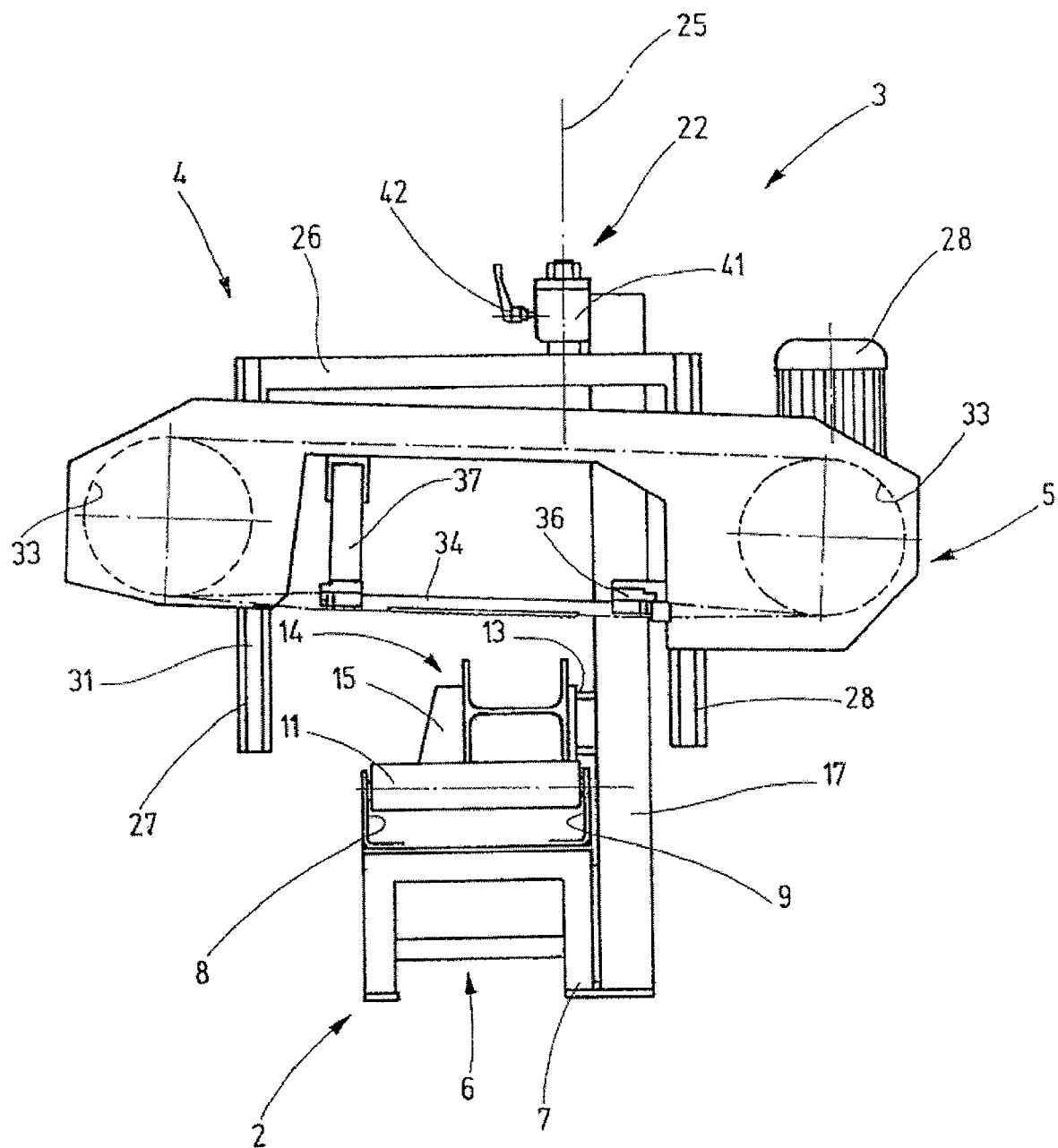
FIG. 3 is an end view of another embodiment of a metal cutting band saw according to the invention with a gallows shaped main carrier.
Figure 4:
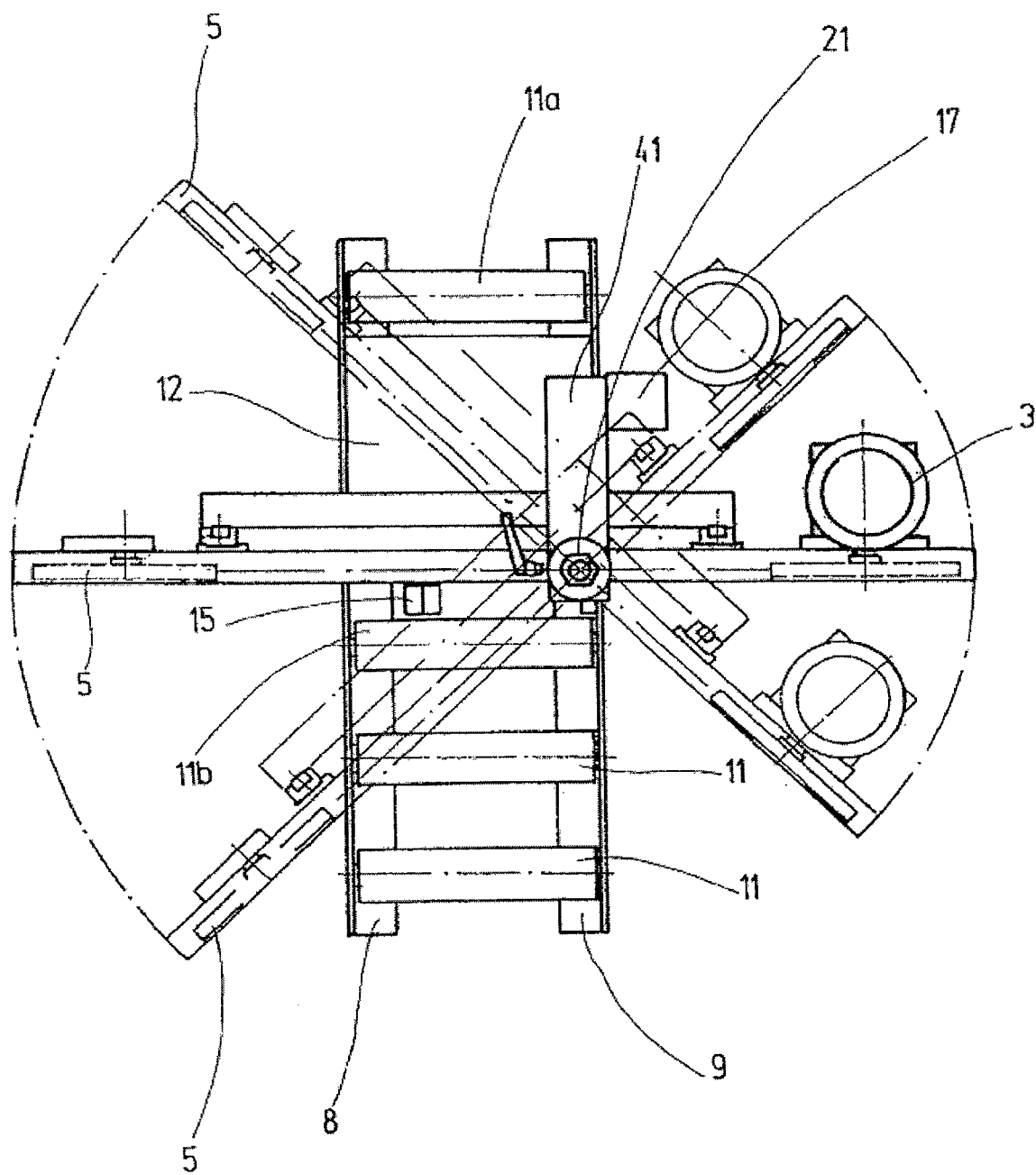
FIG. 4 is a top view of the metal cutting band saw of FIG. 3, in which the miter position adjustments are shown by broken lines.

FIGS. 3 and 4 show another embodiment of the novel metal cutting band saw 1. The key difference between the FIGS. 3 and 4 embodiments is in the design of the main carrier 3. In the embodiment of FIGS. 1 and 2, a gantry shaped main carrier 3 is used. The main carrier 3 in the embodiment according to FIGS. 3 and 4, in contrast, has a gallows like shape. The main carrier consists of a single upright 17 and a projecting beam 41 that projects from the upright 17 a certain distance, parallel to the longitudinal direction of the machine frame 2. On its free end, the projecting beam 41 is provided with the above described swivel support 21 that defines the swivel axis 25, with the swivel axis lying in the plane that contains the contact surface of the stationary jaw 34. The upright 17 is directly mounted on the machine frame 2.

In the embodiment according to FIGS. 3 and 4, a drive device is not provided for adjustment of the miter angle. The intermediate carrier 4 is swiveled manually in this case. After the desired miter angle is adjusted, the spindle 22 is prevented from turning by means of a clamping lever 42. As will be appreciated, use of a swivel support located above the workpiece, which serves to adjust the miter angle, is not limited to saw frames that are guided in a parallel fashion.

Figure 5:
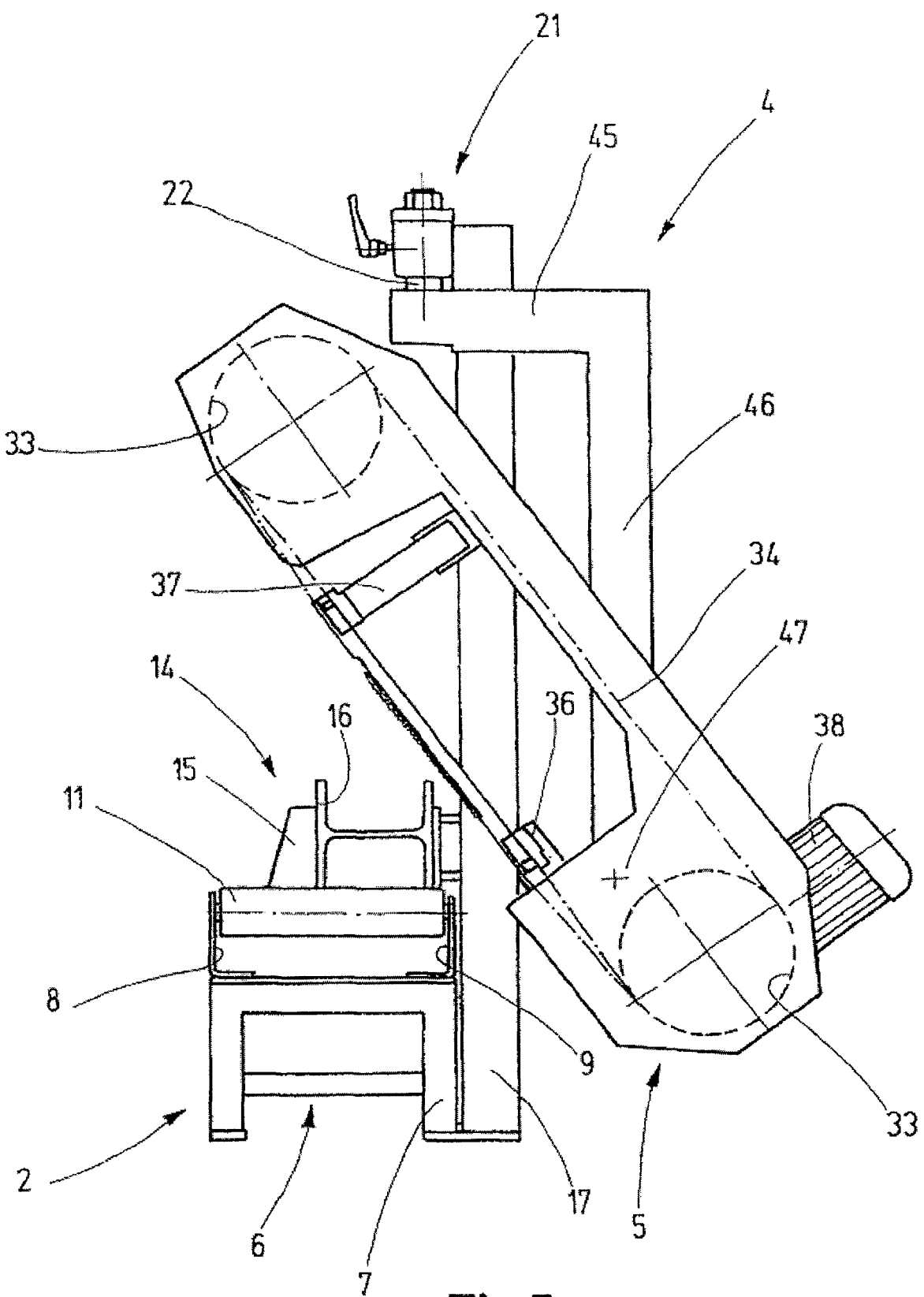
FIG. 5 is an end view of another embodiment of a metal cutting band saw according to the invention, in which the saw frame is pivotally supported.

FIG. 5 shows an embodiment in which the saw frame 5 is mounted on the intermediate carrier 4 similarly to a folding knife. The intermediate carrier 4 in the embodiment according to FIG. 5 has the form of an L and is composed of a crossbeam 45 and a arm 46 that extends vertically downward. The saw frame 5 is hinged via the swivel support 47 (shown schematically) to the intermediate carrier 4 at the lower free end of the arm 46. The position of the horizontally extending swivel axis 47 is chosen such that the bandsaw blade 34 extends approximately horizontally in the end position, i.e., the bandsaw blade extends similarly to the bandsaw blade 34 in the FIG. 1 embodiment when the workpiece 16 is completely separated.

Figure 6:
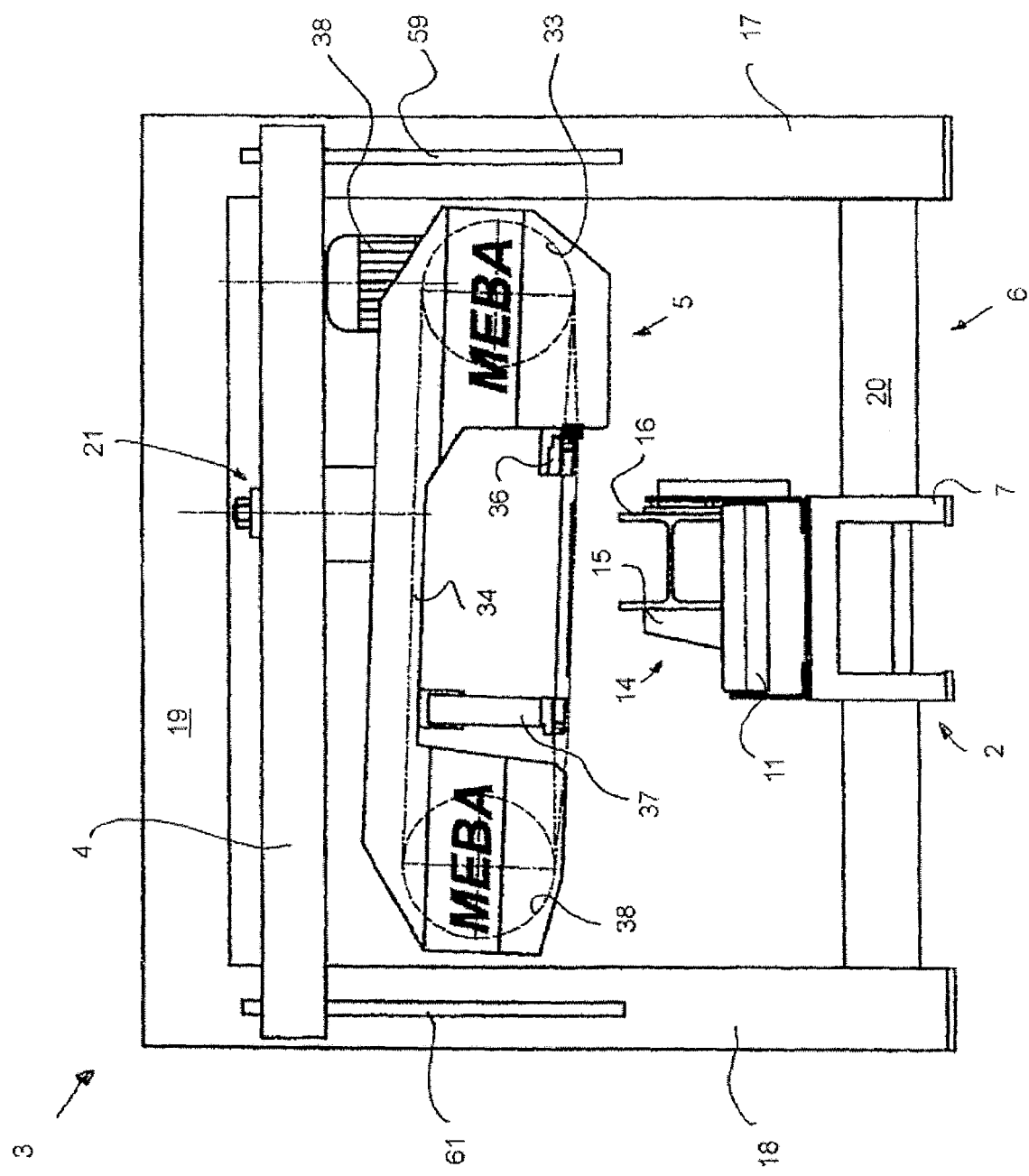
FIG. 6 is an end view of another embodiment of the metal cutting band saw according to the invention with a gantry shaped main carrier.

FIG. 6 shows another embodiment of a metal cutting band saw according to the invention. The FIG. 6 embodiment is configured similar to that shown in FIG. 1. Identical components are identified by the same reference symbols as in the previously discussed figures and are not described in detail. The description of FIG. 6 is essentially limited to the differences between the respective embodiments. The basic difference of the FIG. 6 embodiment in comparison to the embodiment shown in FIG. 1 is that the swivel support 21 is not used to connect the main carrier to the auxiliary carrier, but is arranged between the auxiliary carrier 4 and the saw frame 5. The auxiliary carrier 4 in the embodiment of FIG. 6 consists of a simple crossbeam that extends parallel to the crossbeam 19. Vertically extending guide rails 59 and 61 are provided on the two uprights 17 and 18. Slides, which are contained in the auxiliary carrier 4 and are not visible in FIG. 6, can be moved along the guide rails such that the auxiliary carrier 4 is vertically displaced. The drive motor used to realize the vertical movement of the auxiliary carrier 4 is covered by the upright 17 and is thus not visible in FIG. 6.

In the FIG. 6 embodiment, the swivel axis of the swivel support 21 extends in a plane defined by the stationary jaw 13. The axis is aligned vertically and thus extends parallel to the adjusting movement along the guide rails 59 and 61.

Like the embodiment shown in FIG. 1, the swivel support 21 of the FIG. 6 embodiment is arranged above the workpiece and located in a well protected region. The space beneath the saw table is clear, and it is not necessary to elevate the saw table to an impractical height in order to accommodate a correspondingly strong swivel support that is also able to support the workpiece.

It would be readily apparent to one skilled in the art that the arrangement shown in FIG. 6 could, in principle, also be configured according to the embodiment of FIG. 3, in which the main carrier is not in the form of a gantry, but rather a gallows shaped structure. In this case, the auxiliary carrier 4 can be vertically displaceable on the upright 17. The swivel support 21 for connecting the auxiliary carrier 4 to the saw frame 5 would in such a case be arranged on the auxiliary carrier 4.

A metal cutting band saw contains a main carrier, on which an intermediate carrier is pivotally mounted. The saw frame that can be adjusted in the direction of the workpiece is mounted on the intermediate carrier by means of a swivel support or a parallel guide. The swivel support used to connect the main carrier to the intermediate carrier is located above the workpiece to be processed.

What is claimed is:

1. A horizontal metal cutting band saw for mitering an elongated workpiece comprising:

a machine frame including a support device for supporting the metal workpiece to be processed wherein the support device comprises a vise including a stationary jaw and an adjustable jaw;

a main carrier;

a swivel support arranged on the main carrier above the support device, the swivel support defining a vertical swivel axis that extends through the support device;

an intermediate carrier that is connected to the main carrier by means of the swivel support and can be swiveled about the vertical axis with the aid of the swivel support; and a saw frame including a bandsaw blade configured for cutting metal that runs in a guided fashion, said saw frame being movably supported on the intermediate carrier in such a way that the saw frame can be displaced or swiveled in a plane that extends parallel to the swivel axis;

said stationary jaw of said support device defining a contact surface that includes the vertical swivel axis; and said main carrier having a lateral upright that is located adjacent to said support device and a cantilevered projecting beam mounted on said upright, and said swivel support being supported on said cantilevered projecting beam, outwardly of said lateral upright, wherein the lateral upright is offset relative to the vertical swivel axis in such a way that the intermediate carrier can be moved into opposing miter positions.

2. The metal cutting band saw according to claim 1, wherein driving devices are assigned to the swivel support.

3. The metal cutting band saw according to claim 1, wherein the upright is connected to the machine frame.

4. The metal cutting band saw according to claim 1, wherein the intermediate carrier comprises two vertical arms that are connected to one another by a crossbeam and act as a parallel guide and wherein the saw frame is guided in a height adjustable fashion on the intermediate carrier by the two vertical arms.

5. The metal cutting band saw according to claim 4, wherein each of the vertical arms includes guide rails that connects the saw frame to the intermediate carrier in such a way that the saw frame can be adjusted in the direction of the workpiece along a linear axis.

6. The metal cutting band saw according to claim 1, wherein the support device comprises a support table including a table top that is detachably connected to the machine frame.

7. The metal cutting band saw according to claim 6, wherein the table top is a replaceable part.

8. The metal cutting band saw according to claim 6, wherein the support device comprises rollers and the outer circumferential surfaces of the rollers contact a plane that also includes the table top.

9. The metal cutting band saw according to claim 1, wherein the saw frame includes two rollers that are supported axially parallel to one another and around which runs the bandsaw blade and wherein the bandsaw blade runs in a plane that lies parallel to the axis of the rollers in a region between the rollers.

* * * * *